US012570800B2

(12) United States Patent
Weinelt et al.

(10) Patent No.: US 12,570,800 B2
(45) Date of Patent: Mar. 10, 2026

(54) POLYAMIDES HAVING CYCLIC TERPENOID SUBSTRUCTURES

(71) Applicant: Evonik Operations GmbH, Essen (DE)

(72) Inventors: Frank Weinelt, Billerbeck (DE); Franz-Erich Baumann, Dülmen (DE); Janina Koßmann, Potsdam (DE)

(73) Assignee: Evonik Operations GmbH, Essen (DE)

(*) Notice: Subject to any disclaimer, the term of this patent is extended or adjusted under 35 U.S.C. 154(b) by 668 days.

(21) Appl. No.: 17/611,251

(22) PCT Filed: May 19, 2020

(86) PCT No.: PCT/EP2020/063949
§ 371 (c)(1),
(2) Date: Nov. 15, 2021

(87) PCT Pub. No.: WO2020/234289
PCT Pub. Date: Nov. 26, 2020

(65) Prior Publication Data

US 2022/0227932 A1 Jul. 21, 2022

(30) Foreign Application Priority Data

May 20, 2019 (EP) .................................... 19175334

(51) Int. Cl.
*C08G 69/14* (2006.01)
*C08G 69/16* (2006.01)
*C08G 69/36* (2006.01)

(52) U.S. Cl.
CPC ............ *C08G 69/16* (2013.01); *C08G 69/14* (2013.01); *C08G 69/36* (2013.01)

(58) Field of Classification Search
None
See application file for complete search history.

(56) References Cited

U.S. PATENT DOCUMENTS

| | | | | |
|---|---|---|---|---|
| 2,510,777 | A * | 6/1950 | Gray | C08K 3/32 269/254 R |
| 2,993,879 | A * | 7/1961 | Gabler | C08G 69/02 528/323 |
| 5,405,936 | A | 4/1995 | Mumcu et al. | |
| 5,932,687 | A | 8/1999 | Baumann et al. | |
| 6,316,537 | B1 | 11/2001 | Baumann et al. | |
| 6,335,101 | B1 | 1/2002 | Haeger et al. | |
| 6,579,581 | B2 | 6/2003 | Bartz et al. | |
| 6,656,997 | B2 | 12/2003 | Baumann et al. | |
| 6,677,015 | B2 | 1/2004 | Himmelmann et al. | |
| 6,766,091 | B2 | 7/2004 | Beuth et al. | |
| 6,884,485 | B2 | 4/2005 | Baumann et al. | |
| 7,135,525 | B2 | 11/2006 | Petter et al. | |
| 7,148,286 | B2 | 12/2006 | Baumann et al. | |
| 7,211,615 | B2 | 5/2007 | Baumann et al. | |
| 7,491,792 | B2 | 2/2009 | Monsheimer et al. | |
| 7,582,342 | B2 | 9/2009 | Baumann et al. | |
| 7,708,929 | B2 | 5/2010 | Monsheimer et al. | |
| 7,795,339 | B2 | 9/2010 | Monsheimer et al. | |
| 7,879,938 | B2 | 2/2011 | Hager et al. | |
| 7,906,063 | B2 | 3/2011 | Monsheimer et al. | |
| 8,003,201 | B2 | 8/2011 | Alting et al. | |
| 8,066,933 | B2 | 11/2011 | Monsheimer et al. | |
| 8,119,715 | B2 | 2/2012 | Monsheimer et al. | |
| 8,167,983 | B2 | 5/2012 | Seiler et al. | |
| 8,173,258 | B2 | 5/2012 | Monsheimer et al. | |
| 8,232,333 | B2 | 7/2012 | Hager et al. | |
| 8,303,873 | B2 | 11/2012 | Dowe et al. | |
| 8,357,455 | B2 | 1/2013 | Baumann et al. | |
| 8,449,809 | B2 | 5/2013 | Monsheimer et al. | |
| 8,470,433 | B2 | 6/2013 | Hager et al. | |
| 8,535,811 | B2 | 9/2013 | Luetzeler et al. | |
| 8,574,697 | B2 | 11/2013 | Dowe et al. | |
| 8,580,899 | B2 | 11/2013 | Dowe et al. | |
| 8,591,797 | B2 | 11/2013 | Monsheimer et al. | |
| 8,614,005 | B2 | 12/2013 | Wursche et al. | |
| 8,647,551 | B2 | 2/2014 | Dowe et al. | |
| 8,697,814 | B2 | 4/2014 | Dowe et al. | |
| 8,722,844 | B1 * | 5/2014 | Facinelli | C08G 69/16 528/313 |
| 8,840,829 | B2 | 9/2014 | Monsheimer et al. | |
| 8,865,053 | B2 | 10/2014 | Monsheimer et al. | |

(Continued)

FOREIGN PATENT DOCUMENTS

| | | |
|---|---|---|
| CH | 710 304 | 4/2016 |
| CN | 1290242 | 4/2001 |

(Continued)

OTHER PUBLICATIONS

Sigma-Aldrich data sheet for 4,4'-Methylenebis(cyclohexylamine) 2025 ages 1-8. (Year: 2025).*
German language International Search Report mailed on Aug. 12, 2020 in PCT/EP2020/063949 (4 pages).
International Search Report mailed on Aug. 12, 2020 in PCT/EP2020/063949 (3 pages).
Stockmann et al., "New Bio-Polyamides from Terpenes: a-Pinene and (+)-3-Carene as Valuable Resources for Lactam Production," Copyright 2019 Wiley-VCH Verlag Gmbh & Co. KGaA, Weinheim, Macromol. Rapid Commun., 1800903 (6 pages).

(Continued)

*Primary Examiner* — David J Buttner
(74) *Attorney, Agent, or Firm* — Grüneberg Global IP, PLLC

(57) ABSTRACT

Polyamides are claimed that comprise at least 10% by weight of at least one cyclic terpenoid substructure. The substructure is preferably derived from a monoterpene. A method for preparing the polyamides and for producing the moulding compounds is also described. The moulding compounds comprise 10% to 90% by weight of these polyamides.

19 Claims, 1 Drawing Sheet

(56) References Cited

U.S. PATENT DOCUMENTS

| | | | |
|---|---|---|---|
| 8,999,086 B2 | 4/2015 | Bollmann et al. | |
| 9,057,466 B2 | 6/2015 | Dowe et al. | |
| 9,114,567 B2 | 8/2015 | Monsheimer et al. | |
| 9,180,487 B2 | 11/2015 | Weinelt et al. | |
| 9,643,359 B2 | 5/2017 | Baumann et al. | |
| 9,919,494 B2 | 3/2018 | Franosch et al. | |
| 10,005,885 B2 | 6/2018 | Monsheimer et al. | |
| 10,118,223 B2 | 11/2018 | Monsheimer et al. | |
| 10,406,745 B2 | 9/2019 | Baumann et al. | |
| 10,836,903 B2 | 11/2020 | Peirick et al. | |
| 11,117,837 B2 | 9/2021 | Diekmann et al. | |
| 11,186,688 B2 | 11/2021 | Diekmann et al. | |
| 2003/0114636 A1 | 6/2003 | Schiffer et al. | |
| 2003/0232962 A1 | 12/2003 | Scholl et al. | |
| 2004/0097636 A1 | 5/2004 | Baumann et al. | |
| 2004/0102539 A1 | 5/2004 | Monsheimer et al. | |
| 2004/0137228 A1 | 7/2004 | Monsheimer et al. | |
| 2005/0027050 A1 | 2/2005 | Monsheimer et al. | |
| 2005/0038201 A1 | 2/2005 | Wursche et al. | |
| 2006/0135670 A1 | 6/2006 | Richter et al. | |
| 2006/0223928 A1 | 10/2006 | Monsheimer et al. | |
| 2006/0244169 A1 | 11/2006 | Monsheimer et al. | |
| 2007/0104971 A1 | 5/2007 | Wursche et al. | |
| 2008/0166529 A1 | 7/2008 | Hager et al. | |
| 2008/0217821 A1 | 9/2008 | Goring et al. | |
| 2008/0261010 A1 | 10/2008 | Wursche et al. | |
| 2008/0300353 A1 | 12/2008 | Monsheimer et al. | |
| 2009/0044906 A1 | 2/2009 | Goring et al. | |
| 2011/0130515 A1 | 6/2011 | Monsheimer et al. | |
| 2012/0264877 A1 | 10/2012 | Haeger et al. | |
| 2012/0315483 A1 | 12/2012 | Baumann et al. | |
| 2013/0171388 A1 | 7/2013 | Pawlik et al. | |
| 2013/0274435 A1 | 10/2013 | Diekmann et al. | |
| 2014/0037937 A1 | 2/2014 | Wursche et al. | |
| 2014/0275034 A1 | 9/2014 | Chauhan et al. | |
| 2017/0081472 A1 | 3/2017 | Zhu et al. | |
| 2018/0094103 A1 | 4/2018 | Diekmann et al. | |
| 2019/0177478 A1 | 6/2019 | Micoine et al. | |
| 2019/0275731 A1 | 9/2019 | Baumann et al. | |
| 2020/0062958 A1* | 2/2020 | Ray | C08J 5/18 |
| 2021/0355321 A1 | 11/2021 | Weiss et al. | |
| 2021/0371346 A1 | 12/2021 | Diekmann et al. | |
| 2022/0025118 A1 | 1/2022 | Baumann et al. | |
| 2022/0098372 A1 | 3/2022 | Diekmann et al. | |

FOREIGN PATENT DOCUMENTS

| | | |
|---|---|---|
| CN | 10 7129572 A | 9/2017 |
| DE | 10 2014 221061 A1 | 4/2016 |
| EP | 3 143 069 A1 | 3/2017 |
| WO | 2015/173310 A1 | 11/2015 |
| WO | 2021/063630 A1 | 4/2021 |
| WO | 2021/069277 A1 | 4/2021 |
| WO | 2021/249775 A1 | 12/2021 |

OTHER PUBLICATIONS

Winnacker et al., "Sustainable, Stereoregular, and Optically Active Polyamides via Cationic Polymerization of ε-Lactams Derived from the Terpene β-Pinene," Copyright 2017 Wiley-VCH Verlag Gmbh & Co. KGaA, Weinheim, , Macromol. Rapid Commun., 38, 1600787 (7 pages).

Winnacker et al., "Sustainable terpene-based polyamides via anionic polymerization of a pinene-derived lactam," Copyright 2018, Chem. Commun., 54, pp. 841-844 (4 pages).

Floyd (Reinhold Plastics Applications Series: Polyamide Resins, 2nd Edition, 1966, pp. 59/60.

Gawley, Org. React. 1988, 35, 1 (247 pages).

Kumar et al. "Effect of nitrogen insertion on the antitussive properties of menthol and camphor," Med. Chem. Res. 2012, pp. 531-537 (7 pages).

Lochynski et al., "Stereochemistry of terpene derivatives, Part 2: Synthesis of new chiral amino acids with potential neuroactivity," Tetrahedron: Asymmetry, 2000, 11, pp. 1295-1302 (8 pages).

Stockmann et al., New Bio-Polyamides from Terpenes: α-Pinene and (+)-3-Carene as Valuable Resources for Lactam Production, Macromol. Rapid Commun., 2019 (40), 1800903 (7 pages).

Winnacker et al., "Sustainable terpene-based polyamides via anionic polymerization of a pinene-derived lactam," Chem. Commun. 2018, pp. 841-844 (4 pages).

Winnacker et al., "Sustainable, Stereoregular, and Optically Active Polyamides via Cationic Polymerization of ε-Lactams Derived from the Terpene β-Pinene," Macromol. Rapid Commun., 2017 (38), 1600787 (7 pages).

Winnacker et al., "Synthesis of Novel Sustainable Oligoamides via Ring-Opening Polymerization of Lactams Based on (−)-Menthone," Macromol. Chem. Phys., 2014 (215), pp. 1654-1660.

Kazmaier, Stereochemistry, English translation, 2004, 22 pages.

Written Opinion received for PCT Application No. PCT/EP2020/063949, mailed on Aug. 12, 2020, 14 pages with English translation.

Pierre Louis Dulong, Hypophosphorous acid (HPA), or Phosphinic acid, Wikipedia, 1816, 6 pages.

Von Dr. M. Genas, Rilsan, (Polyamid 11), "Synthese und Eigenschaften", Angew. Chm. 74, 1962, No. 15, 6 pages, with English translation.

* cited by examiner

POLYAMIDES HAVING CYCLIC TERPENOID SUBSTRUCTURES

CROSS REFERENCE TO RELATED APPLICATIONS

This application is a 35 U.S.C. § 371 U.S. national phase entry of International Application No. PCT/EP2020/063949 having an international filing date of May 19, 2020, which claims the benefit of European Application No. 19175334.2 filed May 20, 2019, each of which is incorporated herein by reference in its entirety.

FIELD

The present invention relates to polyamides having cyclic terpenoid substructures.

BACKGROUND

As a means of conserving fossil resources and reducing emissions of greenhouse gases, there is great interest in replacing conventional plastics with ones that can be produced from renewable raw materials. Polyamides can be prepared from condensation of diamines with dicarboxylic acids and from amino acids or lactams. The amino group and the carboxyl group in the latter mean that both functional groups needed for the linkage are present in the same molecule.

Lactams of camphor and menthone have been described in the literature (Kumar, Med. Chem. Res. 2012, page 531). Also known from the literature are lactams from α-pinene and 3-carene (R. E. Gawley, Org. React. 1988, 35, 1). A publication by Lochinski et al. (Tetrahedron: Asymmetry, 2000, 11, 1295) describes the lactam from 3-carene and the ring-opened aminocarboxylic acid prepared therefrom.

CN 10 7129572 A and Winacker (Chem. Commun. 2018, 841-844) disclose anionic polymerizations by means of Grignard compounds or sodium hydride and KOtBu.

DE 10 2014 221061A1 discloses the use of at least one terpene lactam in the production of polyamides. The application discloses an example starting from camphor lactam, which should be reacted with ε-caprolactam to form a copolymer. This method uses a certain amount of a sodium lactamate as a so-called catalyst and a small amount of an acyl caprolactam as a so-called activator. The unreacted residual monomer in the resulting polymer was determined. The mass of camphor-based lactam in the residual monomers exceeded the amount of camphor lactam used (including sodium lactamate) only marginally. No comparative example without camphor lactam is included and no product properties are disclosed either. Those skilled in the art must assume from this disclosure that the camphor lactam is not involved in the polyamide formation at all.

A similar method using menthone lactam published by Winnacker (Macromol. Chem. Phys., 2014 (215), 1654-1660: Synthesis of Novel Sustainable Oligoamides via Ring-Opening Polymerization of Lactams Based on (−)-Menthone) uses benzoyl chloride and a sodium lactamate. MALDI-TOF spectra demonstrated the formation of low-molecular-weight oligomers of the menthone lactam.

Winnacker (Macromol. Rapid Commun., 2017 (40) 1800903) discloses acid-catalyzed (cationic) polyamide formation from pinene-based epsilon-lactam. The polymers from hydrolytic polymerization achieve only a low molar mass and low yield.

Stockmann (Macromol. Rapid Commun., 2019 (38) 1600787) discloses anionic polymerization of carene- and pinene-based lactams; the sole acid-catalyzed reaction afforded no product.

All reaction products according to DE102014221061A1 and Winnacker are substituted with an acyl group at the N-terminus; in the case of DE102014221061A1 the acyl group originates from the acyl caprolactam used and in the case of the Winnacker method it originates from the benzoyl chloride used.

Floyd (Reinhold Plastics Applications Series: Polyamide Resins, 2nd edition, 1966, pages 59/60) published various methods for the production of polyamide 6 (nylon-6). In one of these methods, a nylon-6,6 salt is included in a list of initiators. A purpose or a result of this use is not disclosed.

Floyd additionally discloses, in the section on nylon-6 (page 9 of the above reference), that the product has a monomer content of about 10% when polyamide 6 is produced continuously. The monomer acts as a plasticizer and alters the mechanical properties of the product such that it cannot be used in this form. The residual monomer content can be reduced via a selection of further process steps.

EP3143069A1 discloses disadvantages such as low molar mass and low viscosity in polyamides caused by an excessively high residual monomer content.

SUMMARY

The problem addressed by the present invention is thus that of providing polyamides containing cyclic terpenoid substructures, the scope of the substructures being limited by the nitrogen atoms of the amide groups.

DETAILED DESCRIPTION

Figure 1:
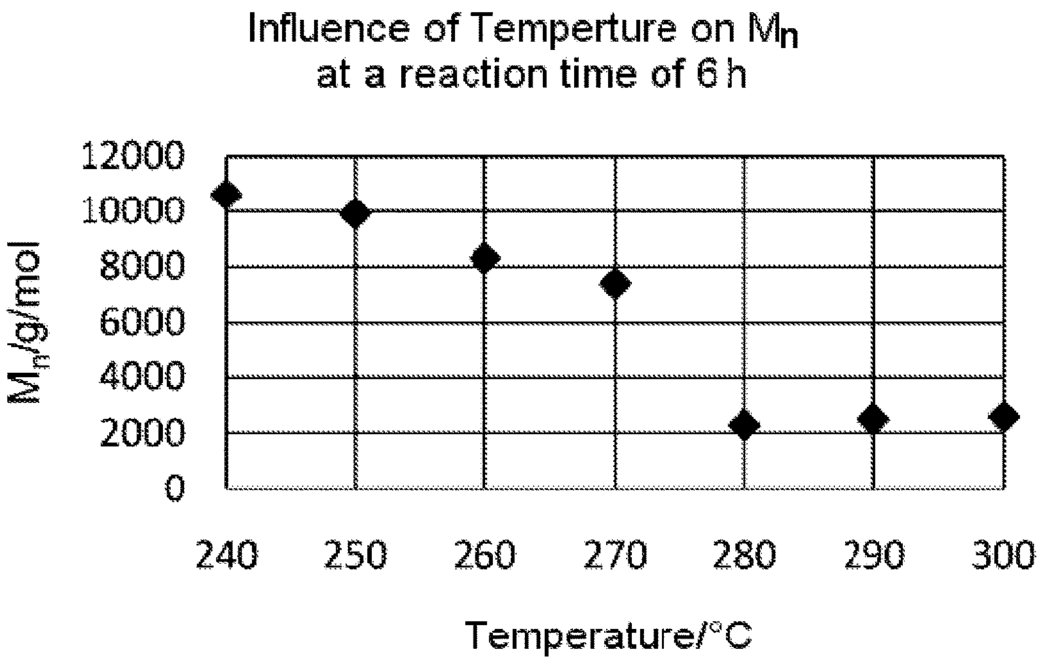
FIG. 1 shows a graph titled Influence of Temperature on Mn at a reaction time of 6 hr.

The present invention provides a method for preparing polyamides in which a small amount of a phosphorus-containing acid and a mediator are added.

The present invention further provides polyamides comprising at least 10% by weight of at least one cyclic terpenoid substructure, wherein the substructure is preferably derived from a monoterpene producible by the method according to the invention.

The present invention further provides moulding compounds comprising 10% to 90% by weight of at least one polyamide of the invention.

The invention further provides a moulded article produced from the moulding compound of the invention. The moulded article is preferably a moulding, a film, a bristle, a fiber or a foam. The moulded article may for example be produced by compression-moulding, foaming, extrusion, coextrusion, blow moulding, 3D blow moulding, coextrusion blow moulding, coextrusion 3D blow moulding, coextrusion suction blow moulding or injection moulding. Processes of this kind are known to those skilled in the art.

The invention further provides for the use of the moulded article of the invention, which may for example be used as a fiber composite component, shoe sole, outer coatings of skis or snowboards, line for media, spectacle frame, design article, sealing material, body protection, insulating material or housing part provided with a film.

The polyamides of the invention, the compositions and moulding compounds comprising the moulding compounds of the invention, the method according to the invention and the use according to the invention are described hereinbelow by means of illustrative examples, without any intention that the invention be restricted to these illustrative embodiments. Where ranges, general formulas, or classes of compound are stated below, these are intended to comprise not only the corresponding ranges or groups of compounds explicitly mentioned, but also all subranges and subgroups of compounds that can be obtained by extracting individual values (ranges) or compounds. Where documents are cited in the context of the present description, the entire content thereof is intended to be part of the disclosure content of the present invention. Where % values are given hereinafter, these are values in % by weight unless otherwise stated. In the case of compositions, % values are based on the total composition unless otherwise stated. Where average values are given hereinafter, these are mass averages (weight averages) unless otherwise stated. Where measured values are given hereinafter, these measured values were determined at a pressure of 101 325 Pa and at a temperature of 25° C. unless otherwise stated.

The scope of protection includes finished and packaged forms of the products according to the invention that are customary in commerce, both as such and in any forms of reduced size, to the extent that these are not defined in the claims.

The optionally different units of the polyamide follow a statistical distribution. Statistical distributions are of blockwise construction with any desired number of blocks and with any desired sequence or they are subject to a randomized distribution; they may also have an alternating construction or else form a gradient over the polymer chain; in particular they can also form any mixed forms in which groups with different distributions may optionally follow one another. Specific embodiments may result in statistical distributions being restricted as a consequence of the embodiment. For all regions unaffected by such restriction, the statistical distribution is unchanged.

An advantage of the polyamides of the invention is that they are transparent.

A further advantage of the polyamides of the invention is that they comprise a substantial proportion by mass of renewable raw materials.

A further advantage of the polyamides of the invention is the reduced residual monomer content. This allows further purification steps to be cut back, making the process more efficient.

Residual monomers within the scope of the present invention refer to the low-molecular-weight fraction having a molar mass of less than 500 g/mol. Measurements were made by GPC, as described in the examples. Content values are in % by weight.

It is known to those skilled in the art that residual monomers adversely affect the properties of polyamides. These residual monomers can act for example as plasticizers, thereby giving rise to inadequate mechanical properties.

A further advantage is the adjustability of the properties of copolyamides based on bicyclic terpene lactams. In particular, the products of the polymerization of pinene lactam have exceptionally high glass transition temperatures.

Monoterpenes are known to those skilled in the art as hydrocarbon structures containing 10 carbon atoms. The cyclic terpenoid substructures may optionally contain a double bond. The polyamides of the invention preferably have three-membered, four-membered and/or five-membered rings in the cyclic terpenoid substructure. More preferably, the polyamides of the invention have 10 carbon atoms in their cyclic terpenoid substructure.

The cyclic terpenoid substructure preferably includes a ring that preferably has two geminal methyl groups. This ring is more preferably a 1,1-dimethylcyclopropane, 1,1-dimethylcyclobutane or 1,1-dimethylcyclopentane and also optionally mixtures of these rings. The 1,1-dimethyl-substituted rings have substituents in the polymer-forming chain only in the $\alpha$ and $\alpha'$ positions, i.e. in the two positions vicinal to the dimethyl-substituted ring member, at the end of which are positioned the functional groups for forming the amide groups. Those skilled in the art will be aware that the groups, the position of which is not yet defined, must be arranged such that formal scission of the claimed substructure results in two formal isoprenoid units.

The polyamides of the invention preferably contain 1 to 100 ppm of a phosphorus-containing component; this component may be inorganic or organic in nature, preferably the inorganic component is an inorganic acid, more preferably hypophosphorous acid. More preferably, the polyamides contain 2 to 100 ppm, even more preferably 5 to 60 ppm, with the content values being based on the total mass of the polyamides.

The polyamides of the invention preferably have a residual monomer content of 3% to 20% by weight, preferably 5% to 15% by weight, more preferably 7% to 13% by weight, based on the total mass of the polyamides.

The polyamides of the invention preferably have a molar mass of at least 3500 g/mol. More preferably, the polyamide has a molar mass of at least 3500 g/mol and a proportion of at least 50% by weight consisting of a cyclic terpenoid substructure, with the cycle having 4 ring members. More preferably, the polyamide comprises at least 60% by weight, in particular at least 70% by weight and not more than 95% by weight, preferably not more than 90% by weight, more preferably not more than 85% by weight, of cyclic terpenoid substructures having 4 ring members.

The polyamides of the invention preferably have a molar mass of at least 8000 g/mol, preferably at least 9000 g/mol, more preferably at least 10 000 g/mol. More preferably, the polyamide has a molar mass of at least 8000 g/mol and a proportion of at least 50% by weight consisting of a cyclic terpenoid substructure, with the cycle having 3 ring members. More preferably, the polyamide comprises at least 60% by weight, in particular at least 70% by weight and not more than 95% by weight, preferably not more than 90% by weight, more preferably not more than 85% by weight, of cyclic terpenoid substructures having 3 ring members.

Molar masses in the present invention are number-average molar masses (Mn) and can be established according to the prior art; the determination of molar masses is preferably by GPC or through determination of end groups, more preferably by GPC.

In addition to the cyclic terpenoid substructure, the polyamide of the invention preferably contains at least one unit of a polyamide K, L and/or M, wherein the sum of the units consisting of K+L+M is at least 2. The unit K is derived from a diamine, L from a diacid and M from an amino acid. In such cases, the polyamide of the invention is a copolyamide.

The proportion of polyamide structures consisting of K, L and/or M is preferably from 1% to 90% by weight, preferably from 2% to 75% by weight, more preferably from 3% to 60% by weight, even more preferably from 5% to 50% by weight, especially preferably from 10% to 30% by weight, and in particular from 15% to 25% by weight.

The polyamide of the invention preferably has a glass transition temperature of greater than or equal to 100° C., preferably 105° C., more preferably 110° C.

The polyamide of the invention preferably has a residual monomer content of less than or equal to 15% by weight, 13% by weight, 12% by weight, 11% by weight, particularly preferably less than or equal to 10% by weight.

The polyamide of the invention preferably includes as cyclic terpenoid substructures at least 10 mol % of a cyclic terpenoid substructure having a four-membered ring, the indicated content being based on the total polyamide. The polyamide of the invention preferably includes at least 15 mol %, at least 20, 30, 40, 50, 60, 70, 80, 85, 90 and particularly preferably 95 mol-% of cyclic terpenoid substructures having a four-membered ring.

The polyamide of the invention comprising at least 10% by weight of at least one cyclic terpenoid substructure and the polyamide structures K, L and/or M preferably does not contain any other polyamides.

The polyamide of the invention preferably has repeat units selected from the following cyclic terpenoid substructures:

1c'

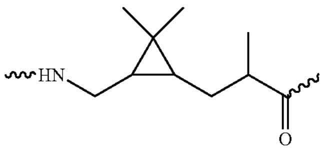

1c''

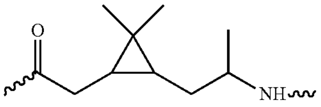

1'c'

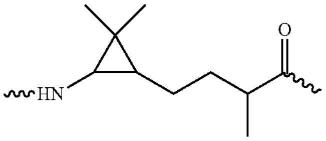

1'c''

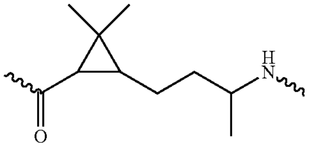

2c'

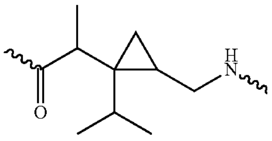

2c''

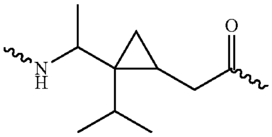

-continued

3c'

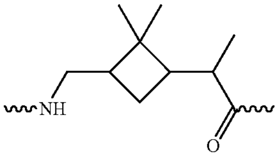

3c''

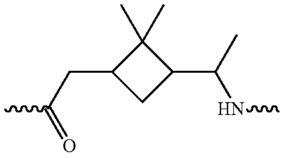

3'c'

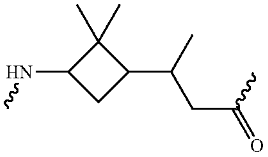

3'c''

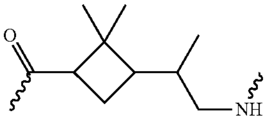

4c'

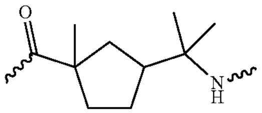

4c''

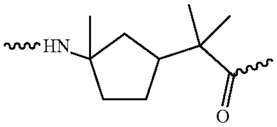

4'c'

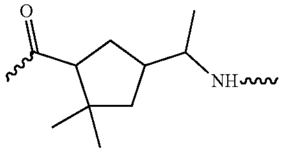

4'c'''

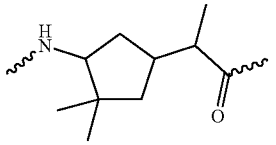

4''c'

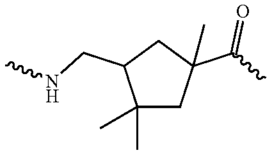

4''c''

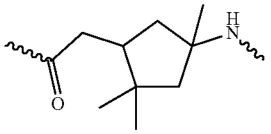

-continued

4'''c'

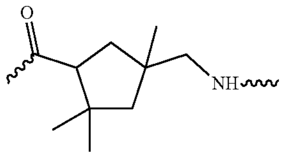

4'''c''

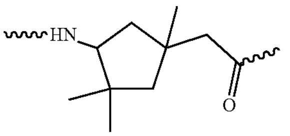

5c'

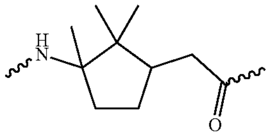

5c''

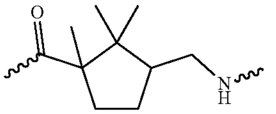

Preference is given to the substructures 1c', 1c'', 1'c', 1'c'', 3c', 3c'', 3'c', 3'c'', 5c' and 5c''. Particular preference is given to the substructures 1c', 1c'', 3c', and 3c''.

The polyamides of the invention may be prepared according to the prior art, but preferably according to the method of the invention, which comprises the following steps:

a) provision of at least one bicyclic terpene lactam, b) ring-opening polymerization of at least one bicyclic terpene lactam to afford a polyamide, preferably a homopolyamide or a copolyamide, wherein a phosphorus-containing acid is used in step b) in an amount from 2 to 100 ppm based on the total mass of the monomers used, wherein in step b) a mediator is added.

In step a), preference is given to bicyclic terpene lactams that, in addition to the lactam ring, have a three-membered ring, a four-membered ring or a five-membered ring.

Step b) is preferably carried out by adding a phosphorus-containing acid, more preferably hypophosphorous acid. Preference is given to using an amount from 2 to 100 ppm, more preferably from 10 to 100 ppm, especially preferably from 20 to 100 ppm and particularly preferably from 30 to 60 ppm. The content values are based on the total mass of the monomers used.

Step b) is preferably carried out at "lower" temperature, preferably below 270° C., more preferably below 260° C., 255° C., 250° C., 245° C. and at least at 240° C.

The reaction time in step b) at a temperature of at least 240° C. is preferably maintained for "not too long", preferably for up to 10, 8, 7, 6, 5, 4 hours, with a minimum of 2 hours.

The pressure set at the reaction temperatures ("high pressure") in step b) is preferably maintained for 10 to 90% of the reaction time, after which it is lowered to ambient pressure and left for the remaining reaction time at a pressure of 1 to 1.2 bar. More preferably, the high pressure is maintained for 20 to 80%, more preferably 30 to 70% and particularly preferably 40 to 60%.

Step b) is preferably carried out using a mediator, which is incorporated during the reaction into the polyamide of the invention, and preferably a phosphorus-containing acid is used in an amount from 2 to 100 ppm based on the total mass of the monomers used.

Preference is given to using as mediators a nylon salt or an α,ω-amino acid (as the intramolecular salt). The mediator is used preferably in an amount of not more than 25% by weight, 20% by weight, 15% by weight, 10% by weight, 5% by weight, particularly preferably 5 to 17% by weight, 8 to 15% by weight, 9 to 13% by weight, based on the amount of monomers used, particularly preferably based on the amounts of bicyclic terpene lactams used.

The nylon salt consists of an α,ω-diammonium compound and an α,ω-dicarboxylate compound and the nylon salt is preferably aliphatic. The diammonium compound is preferably nonlinear, more preferably the diammonium compounds have more than 6 and up to 25 carbon atoms. Preference is given to diammonium compounds that have at least one ring structure. Particular preference is given to diammonium compounds that include a PACM (4,4'-methylenebis[cyclohexanamine]) structure. Preference is given to dicarboxylate compounds having more than 6 and up to 25 carbon atoms. Particular preference is given to diammonium compounds having at least one ring structure and dicarboxylate compounds having more than 6 and up to 25 carbon atoms.

In the context of the present invention, the term "terpene lactam" is understood as meaning a chemical compound that has at least one bicyclic system, with one ring containing an amide linkage —NH—CO—.

In all cases where molecules/molecule fragments have one or more stereocenters or can be differentiated into isomers on account of symmetries or can be differentiated into isomers on account of other effects, for example restricted rotation, all possible isomers are covered by the present invention.

Isomers are known to those skilled in the art; in particular, reference is made to the definitions of Prof. Kazmaier of Saarland University, for example http://www.uni-saarland.de/fak8/kazmaier/PDF_files/vorlesungen/Stereochemie%20Strassb%20Vorlage.pdf.

Where reference is made within the scope of this invention to natural products, for example pinene, this is generally to be understood as meaning all isomers, with preference given to the respective naturally occurring isomers, this being α-pinene in the case referred to here.

Natural products are defined by reference to the scope of the "Dictionary of Natural Products", Chapman and Hall/CRC Press, Taylor and Francis Group, for example in the online version from 2018: http://dnp.chemnetbase.com/.

Terpene derivatives may be synthetic or semisynthetic in nature or they may have been isolated as a natural product from a living organism of the biosphere or from another source. Preference is given to starting materials obtained from residues from cellulose production and then converted synthetically into the corresponding lactams.

In particular, all possibilities that arise from the stereochemical definitions of tacticity are covered, for example isotactic, syndiotactic, heterotactic, hemiisotactic, atactic. Preference in the context of the invention is given to polyamides having an at least partially atactic substituent sequence.

The bicyclic terpene lactams have a plurality of stereocenters.

Particularly preferred bicyclic terpene lactams have, in addition to the lactam ring, a three-membered ring, a four-membered ring or a five-membered ring.

The bicyclic terpene lactams are preferably prepared from corresponding bicyclic terpene ketones.

The bicyclic terpene ketones are preferably prepared from corresponding bicyclic monounsaturated terpenes or corresponding bicyclic hydroxylated terpenes. Especially preferably, the ketones are prepared from the following precursor molecules:

1

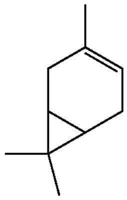

1′

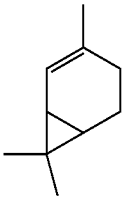

2

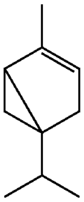

3

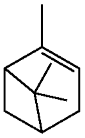

3′

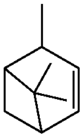

4

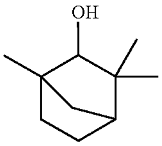

4′

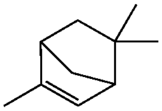

4″

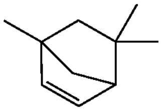

-continued

5

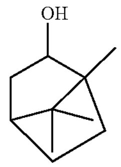

Especially preferred bicyclic terpene ketones are:

1a

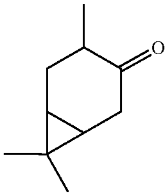

1′a

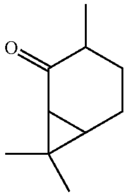

2a

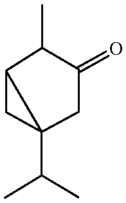

3a

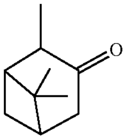

3′a

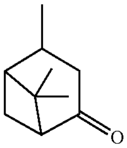

4a

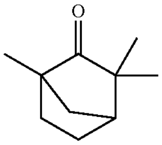

4′a

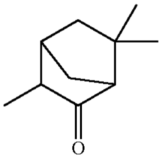

-continued
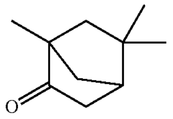
4″a
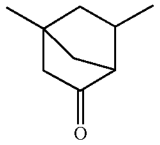
4″a′
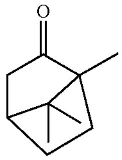
5a
Especially preferred bicyclic three-membered ring terpene lactams are:
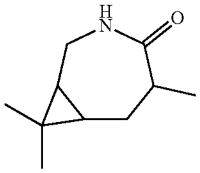
1b′
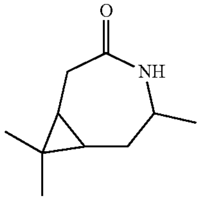
1b″
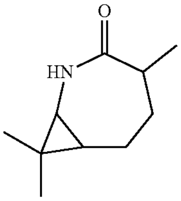
1′b′
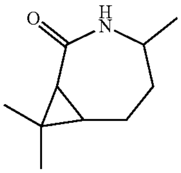
1′b″
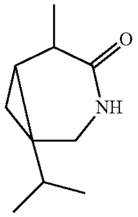
2b′
-continued
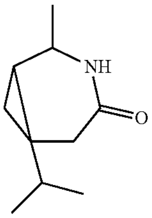
2b″
Especially preferred bicyclic four-membered ring terpene lactams are:
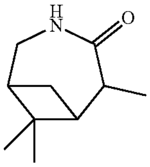
3b′
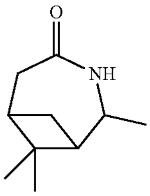
3b″
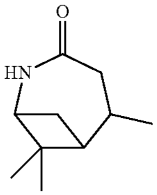
3′b′
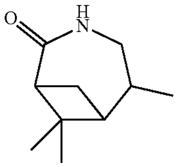
3′b″
Especially preferred bicyclic five-membered ring terpene lactams are:
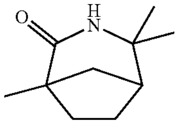
4b′
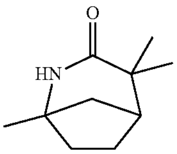
4b″

-continued

4′b′

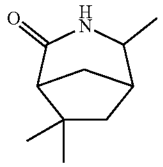

4′b′′′

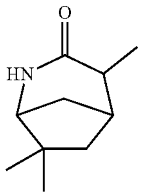

4″b′

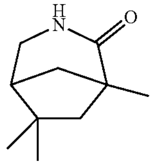

4″b″

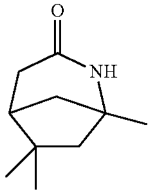

4′′′b′

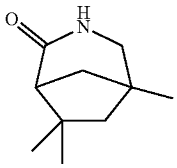

4′′′b″

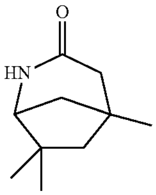

5b′

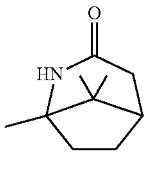

5b″

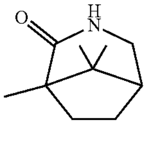

Particularly preferred bicyclic terpene lactams are those of the formulas: 1b', 1b", 1'b', 1'b", 3b', 3b", 3'b', 3'b", 5b' and 5b".

In the method according to the invention, preference is given to using no metal lactamates.

In the method according to the invention, preference is given to using no N-acyl lactams.

Particular preference is given to using no metal lactamates and no N-acyl lactams.

The polymerization of all the lactams and bifunctional compounds provided in step a) preferably takes place in step b). More preferably, conversion of at least 95%, preferably at least 90%, particularly preferably at least 85%, takes place. The conversion is determined from the residual monomer content in the polyamide of the invention.

The present invention further provides a polyamide prepared by the method according to the invention.

FIG. 1 describes the influence of temperature on the number-average molar mass (Mn) with a reaction time of 6 h for a polyamide consisting of substructure units derived from carene. At least 95 mol % of the lactam consisted of 3R,4S,6R-carene lactam.

Figure 2:
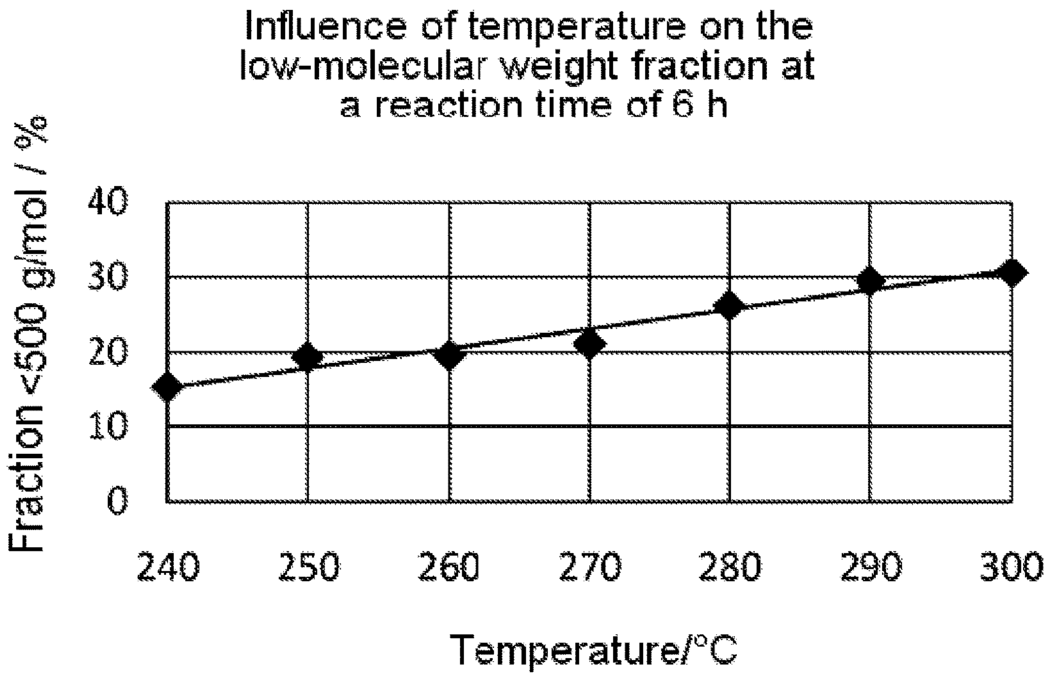
FIG. 2 shows a graph titled Influence of temperature on the low-molecular weight fraction at a reaction time of 6 hr.

FIG. 2 describes the influence of temperature on the residual monomer content with a reaction time of 6 h, as described in FIG. 1.

Methods

Differential Scanning Calorimetry (DSC):

All DSC measurements were carried out on a Mettler Toledo DSC1 instrument in an open aluminium crucible unless otherwise described. A method is used for polymers in which heating is carried out twice. For the determination of the glass transition temperature, only the second heating curve is used. In the diagrams, the first heating curve is shown in black, the cooling curve in red and the curve for the second heating in blue. In the case of monomers, heating is normally carried out only once.

Nuclear Magnetic Resonance (NMR):

All $^{1}H$, $^{13}C\{^{1}H\}$, $^{13}C$ DEPT-135 and 2D-NMR spectra were recorded on a Bruker Avance III HD 500 instrument. Various solvents are used, with locking at the respective resonances as standard. Signal multiplicities are abbreviated as follows: s: singlet; d: doublet; dd: doublet of doublets; ddd: doublet of doublet of doublets; t: triplet; td triplet of doublets; tt: triplet of triplets; q quartet; m: multiplet. Quaternary carbon nucleii, methine, methylene and methyl groups were assigned with the aid of $^{13}C$ DEPT-135 spectra.

Relative Solution Viscosity ($\eta_{rel}$):

The samples are dissolved in m-cresol at 30° C. (0.005 g/ml) and measured in a viscosity measurement system (LAUDA PVS or Schott AVS Pro) at 25.00° C.

Gel-Permeation Chromatography (GPC):

GPC analyses were carried out using an Agilent system of modular construction. This included pumps, autosampler and column combinations (PSG columns). The detectors used were RI detectors. The samples are dissolved in hexafluoroisopropanol (HFIP) in a concentration of c=5 g/l with addition of 0.05 mol/1 of potassium trifluoroacetate. The measurements are carried out with HFIP and 0.05 mol/1 potassium trifluoroacetate at a flow rate of 0.8 ml/min with RI detection; calibration was against 12 PMMA standards distributed across a narrow range ($M_p$ between 505 g/mol and $4*10^6$ g/mol).

The alkalimetric determination of carboxyl end groups was carried out in benzyl alcohol and that of the amino end groups in m-cresol at 100° C. using a Metrohm 809 Titrando.

Since the number of end groups is inversely proportional to the length of the chains, the molar mass can be estimated from the determination of the end groups. End groups are expressed in mmol/kg. These values are used to calculate the number-average molar mass according to the following formula:

$$M_n = \frac{2*10^6}{\text{Amino end groups}\left[\frac{\text{mmol}}{\text{kg}}\right] + \text{Carboxyl end groups}\left[\frac{\text{mmol}}{\text{kg}}\right]}$$

Gas Chromatographic Analysis (GC) for Determination of the Monomer Content:

Gas chromatographic analyses were carried out on a two-column system having two separation columns of different polarity. Unless otherwise described, the samples are dissolved in toluene. Detection was with the aid of a flame-ionization detector (FID). The fractions detectable by gas chromatography were evaluated by normalization to 100 area-%.

Gas Chromatography with Coupled Mass Spectrometry (GC-MS):

GC-MS measurements are carried out on an Agilent GC 7890/Agilent MSD 5977 system.

The separation in the GC/FID analysis was recreated on a comparable column in a GC system with mass spectrometric detection (GC-MS). The signals were detected chromatographically in similar manner to the GC/FID analysis. Ionization was by electron-impact ionization.

Example 1: General Procedure for the Polymerization of Carene Lactam

A thick-walled test tube was charged with 10 g (0.0598 mol) of carene lactam. To this was added 30% by weight of water (4.3 ml), 57 ppm of $H_3PO_2$ and, if specified, the salt of PACM20 and DDA. The test tube was placed in a steel bomb tube equipped with a manometer. The apparatus was tightly closed and flushed with nitrogen for 15 min. To check that the apparatus was airtight, it was then closed with a nitrogen pressure of 1 bar and observed for 5 min to see whether the pressure remained stable. The tightly closed steel bomb tube was placed in a metal bath filled with Wood's metal and heated to the reaction temperature over a 30 min period. The temperature and pressure were maintained for half the reaction time. At the end of this time, the apparatus was depressurized to standard pressure over a 30 min period and flushed with nitrogen, with the temperature maintained for the remainder of the reaction time. The steel bomb tube was then taken out of the metal bath and allowed to stand overnight at room temperature and in a stream of nitrogen.

TABLE 1

Reaction conditions and analysis results for example 1, T = temperature, MAmt = mediator amount in mol % based on the amount of carene lactam used, Mono = monomer fraction (residual monomer content)

| | Reaction conditions | | | | | |
|---|---|---|---|---|---|---|
| | Reaction | | | Analysis | | |
| No. | T [° C.] | time [h] | MAmt [mol %] | Tg [° C.] | Mn [g/mol] | Mono [%] |
| C28 | 270 | 8.5 | 10 | 103 | 6400 | 17.69 |
| C29 | 250 | 5 | 10 | 110 | 11900 | 13.38 |
| C30 | 250 | 6 | 10 | 114 | 10900 | 13.99 |
| C16 | 270 | 8.5 | 0 | 97 | 6600 | 20.56 |
| C5 | 250 | 5 | 0 | 101 | 9300 | 19.41 |
| C6 | 250 | 6 | 0 | 108 | 9900 | 19.36 |
| C7 | 250 | 7.5 | 0 | 112 | 10400 | |
| C8 | 250 | 8.5 | 0 | 106 | 6700 | |

TABLE 1-continued

Reaction conditions and analysis results for example 1, T = temperature, MAmt = mediator amount in mol % based on the amount of carene lactam used, Mono = monomer fraction (residual monomer content)

| | Reaction conditions | | | | | |
|---|---|---|---|---|---|---|
| | Reaction | | | Analysis | | |
| No. | T [° C.] | time [h] | MAmt [mol %] | Tg [° C.] | Mn [g/mol] | Mono [%] |
| C13 | 270 | 5 | 0 | | 5800 | |
| C14 | 270 | 6 | 0 | | 7400 | |
| C16 | 270 | 8.5 | 0 | | 6600 | |
| C17 | 270 | 9.5 | 0 | | 4000 | |
| C18 | 270 | 24 | 0 | | 3200 | |

Comparison of experiments C28, C29 and C30 with the analogous experiments without addition of mediator; C16, C5 and C6 show a distinctly reduced residual monomer content. Also advantageous is that, with reaction times of 5 and 6 hours, the molar masses are increased by addition of the mediator.

The glass transition temperatures correlate with the molar masses.

Comparison of the reaction times shows that, at the same temperature, the molar mass decreases sharply with increasing reaction time. The optimum reaction time decreases with increasing reaction temperature.

Example 2: General Procedure for the Polymerization of Pinene Lactam

A thick-walled test tube was charged with 10 g (0.0598 mol) of pinene lactam. To this was added 35% by weight of water (5.4 ml), 57 ppm of $H_3PO_2$ and the mediator (as indicated in table 2) and the test tube was placed in a steel bomb tube equipped with a manometer. The apparatus was flushed with nitrogen for 15 min. The airtightness was then checked as in example 1. Heating to the reaction temperature was carried out as described in example 1. The temperature and pressure were maintained for 2.5 h. At the end of this time, the apparatus was depressurized over a 30 min period and flushed with nitrogen, with the temperature maintained for a further 3 h under a stream of nitrogen. The steel bomb tube was then taken out of the metal bath and allowed to stand overnight at room temperature and in a stream of nitrogen.

Without addition of mediators, no conversion into polymers could be detected either by NMR spectroscopy or by IR spectroscopy.

The salts as mediators were prepared by heating equimolar amounts of diamine with dicarboxylic acid in ethanol, where necessary distilling off a little solvent and removing the water azeotropically.

TABLE 2

Reaction conditions and analysis results for example 2, T = temperature, MAmt = mediator amount in mol % based on the amount of pinene lactam used, Mono = monomer fraction (residual monomer content)

| | Reaction conditions | | | Analysis | | | |
|---|---|---|---|---|---|---|---|
| No. | T [° C.] | Mediator | MAmt [mol %] | $\eta_{rel}$ | Tg [° C.] | Mn [g/mol] | Mono [%] |
| P2 | 260 | PACM20/DDA | 5 | | | | |
| P3 | 280 | PACM20/DDA | 10 | | | | |
| P4 | 270 | PACM20/DDA | 10 | | | | |
| P5 | 260 | PACM20/DDA | 10 | 1.2 | 344 | 4500 | 5.48 |
| P6 | 260 | PACM20/DDA | 15 | | | | |
| P7 | 260 | 12-ADA | 10 | 1.1 | 309 | 3700 | 8.80 |
| P8 | 260 | 12-ADA | 15 | | | | |
| P9 | 260 | AH | 10 | 1.1 | 326 | 3900 | 8.01 |

PACM20: 4,4'-Methylenebis(cyclohexylamine) with a trans-trans-content of approx. 20%
DDA: 1,12-Dodecanedioic acid
12-ADA: 12-Aminododecanoic acid, aminolauric acid
AH: Hexamethylenediamine + adipic acid
Product P2 was investigated by NMR spectroscopy in benzene solution.

Example 2, in which pinene lactam is used as monomer, demonstrates the need for using a mediator.

It was also found that the best results are achieved using the most sterically demanding mediator.

The glass transition temperature is unusually high for polyamides.

The invention claimed is:

1. A polyamide, comprising:

at least 10% by weight of at least one cyclic terpenoid substructure, wherein the substructure is derived from a monoterpene produced by ring-opening polymerization of at least one bicyclic terpene lactam in the presence of a mediator selected from a group consisting of nylon salt or an α,ω-amino acid which is 12-ADA, wherein said polyamide contains from 1 to 100 ppm of a phosphorus-containing component, wherein the amount of mediator employed is in a range of 5 to 17% by weight based on the amount of monomers used, wherein the nylon salt comprises a diammonium compound that has a ring structure and a dicarboxylate compound, and wherein the phosphorus-containing component comprises hypophosphorous acid.

2. A method for preparing a polyamide according to claim 1, that comprises the following steps:

a) provision of the at least one bicyclic terpene lactam, b) ring-opening polymerization of the at least one bicyclic terpene lactam to afford the polyamide, wherein a phosphorus-containing acid is used in step b) in an amount from 2 to 100 ppm based on the total mass of the monomers used, wherein in step b) the mediator is added.

3. The method according to claim 2, wherein the reaction temperature does not exceed 270° C.

4. The polyamide according to claim 1, wherein the mediator is the nylon salt.

5. The polyamide according to claim 4, wherein the diammonium compound has more than 6 and up to 25 carbon atoms.

6. The polyamide according to claim 4, wherein the diammonium compound includes a PACM structure.

7. The polyamide according to claim 1, wherein the mediator is the α,ω-amino acid.

8. The polyamide according to claim 1, wherein said polyamide has a residual monomer content of from 3% to 20% by weight of the total mass of the polyamides.

9. The polyamide according to claim 8, wherein the polyamide has three-membered, four-membered and/or five-membered rings in their cyclic terpenoid substructure.

10. The polyamide according to claim 8, wherein the cyclic terpenoid substructure includes a ring having two geminal methyl groups.

11. The polyamide according to claim 8, wherein the polyamide has four-membered rings in their cyclic terpenoid substructure and a molar mass of at least 3500 g/mol or have three-membered rings in their cyclic terpenoid substructure and a molar mass of at least 8000 g/mol.

12. The polyamide according to claim 1, wherein said polyamide has three-membered, four-membered and/or five-membered rings in their cyclic terpenoid substructure.

13. The polyamide according to claim 12, wherein the cyclic terpenoid substructure includes a ring having two geminal methyl groups.

14. The polyamide according to claim 1, wherein the cyclic terpenoid substructure includes a ring having two geminal methyl groups.

15. The polyamide according to claim 1, wherein said polyamide has four-membered rings in their cyclic terpenoid substructure and a molar mass of at least 3500 g/mol or have three-membered rings in their cyclic terpenoid substructure and a molar mass of at least 8000 g/mol.

16. A moulding compound, comprising:

from 10% to 90% of at least one polyamide according to claim 1.

17. A shaped article produced from the moulding compound according to claim 16.

18. The polyamide according to claim 1, wherein the mediator is incorporated into the polyamide.

19. The polyamide according to claim 1, wherein the mediator is PACM20/DDA or 12-ADA.

* * * * *